(12) United States Patent
Fischer

(10) Patent No.: US 8,213,370 B2
(45) Date of Patent: Jul. 3, 2012

(54) METHOD OF TRANSMITTING ON A RANDOM ACCESS CHANNEL BASED ON PARAMETER RELATING TO PERFORMANCE OF PERSISTENCE TEST

(75) Inventor: Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 855 days.

(21) Appl. No.: 12/066,243

(22) PCT Filed: Sep. 22, 2006

(86) PCT No.: PCT/KR2006/003782
§ 371 (c)(1),
(2), (4) Date: Mar. 7, 2008

(87) PCT Pub. No.: WO2007/052900
PCT Pub. Date: May 10, 2007

(65) Prior Publication Data
US 2008/0253323 A1 Oct. 16, 2008

Related U.S. Application Data

(60) Provisional application No. 60/732,288, filed on Oct. 31, 2005.

(51) Int. Cl.
*H04W 4/00* (2009.01)
(52) U.S. Cl. ........ 370/329; 370/341; 370/431; 370/437; 455/434; 455/450; 455/464; 455/511; 455/509
(58) Field of Classification Search .................. 370/329, 370/341, 431, 437; 455/434, 450, 464, 511, 455/509
See application file for complete search history.

(56) References Cited

U.S. PATENT DOCUMENTS

| | | | |
|---|---|---|---|
| 6,374,099 B1 * | 4/2002 | Bi et al. ................. | 455/404.1 |
| 6,535,736 B1 * | 3/2003 | Balogh et al. ............ | 455/434 |
| 6,625,138 B2 | 9/2003 | Karna et al. | |
| 6,778,835 B2 | 8/2004 | You et al. | |
| 6,823,193 B1 | 11/2004 | Persson et al. | |
| 2002/0094834 A1 | 7/2002 | Baker et al. | |
| 2003/0031119 A1 | 2/2003 | Kim et al. | |
| 2003/0139170 A1 * | 7/2003 | Heo .......................... | 455/410 |
| 2003/0144021 A1 | 7/2003 | Cao et al. | |
| 2003/0185159 A1 | 10/2003 | Seo et al. | |
| 2003/0223452 A1 * | 12/2003 | Toskala et al. .......... | 370/442 |

(Continued)

FOREIGN PATENT DOCUMENTS

CN 1505910 6/2004

(Continued)

OTHER PUBLICATIONS

Hauwei; "Proposal on Activation Time in RB Setup message"; 3GPP TSG-RAN WG2 Meeting #49; R2-052777; Nov. 7, 2005.

(Continued)

*Primary Examiner* — Jeffrey Pwu
*Assistant Examiner* — Abdelnabi Musa
(74) *Attorney, Agent, or Firm* — Lee, Hong, Degerman, Kang & Waimey

(57) ABSTRACT

Optimizing call setup procedures by determining whether a trigger for a random access procedure is independent for a restricted number of terminals, and performing a preamble transmission with or without a delay based upon the determining.

13 Claims, 2 Drawing Sheets

U.S. PATENT DOCUMENTS

| | | |
|---|---|---|
| 2004/0077348 A1 | 4/2004 | Sebire et al. |
| 2004/0218569 A1 | 11/2004 | Pedersen et al. |
| 2004/0264497 A1 | 12/2004 | Wang et al. |
| 2005/0043034 A1* | 2/2005 | Abdel-Ghaffar et al. ..... 455/453 |
| 2006/0062145 A1 | 3/2006 | Kirla |
| 2007/0111663 A1 | 5/2007 | Beyer et al. |

FOREIGN PATENT DOCUMENTS

| | | |
|---|---|---|
| EP | 1351424 | 10/2003 |
| JP | 11068820 | 3/1999 |
| JP | 2001-251666 | 9/2001 |
| JP | 2003-115796 | 4/2003 |
| JP | 2005072682 | 3/2005 |
| JP | 2006-141033 | 6/2006 |
| KR | 20030056126 | 7/2003 |
| KR | 20040005839 | 1/2004 |
| KR | 10-2004-0035511 | 4/2004 |
| TW | 486895 | 5/2002 |
| TW | 517488 | 1/2003 |
| TW | 576054 | 2/2004 |
| WO | 03088695 | 10/2003 |

OTHER PUBLICATIONS

Alcatel; "HS-DSCH Serving Cell Change Procedure Corrections"; 3GPP TSG-RAN3 Meeting #41; Tdoc R3-040261; Feb. 16, 2004.

LG Electronics Inc.; "Reconfiguration with activation time 'now'"; 3GPP TSG-RAN WG3 Meeting #53; Tdoc R3-060549; May 8, 2006.

* cited by examiner

[Fig. 1]
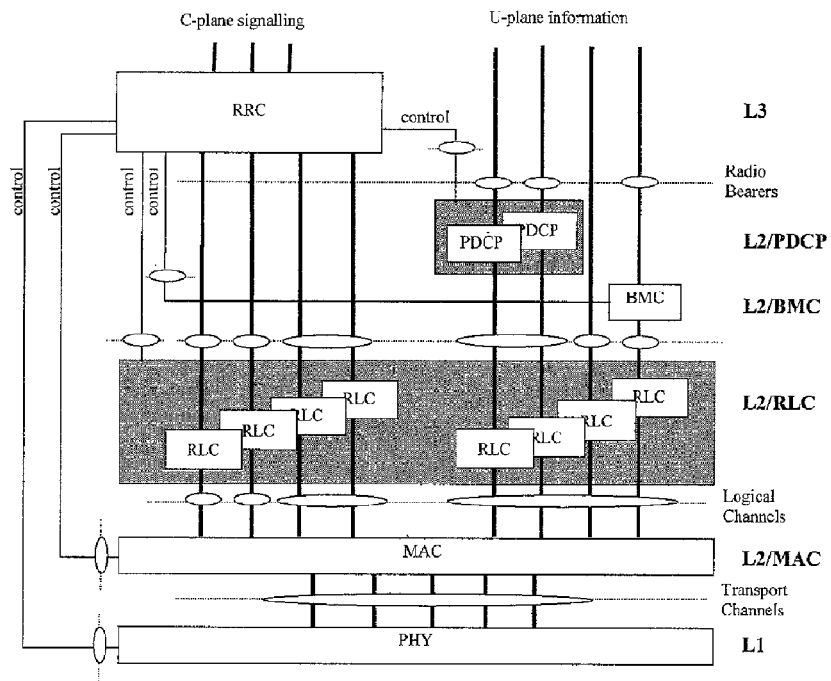
[Fig. 2]
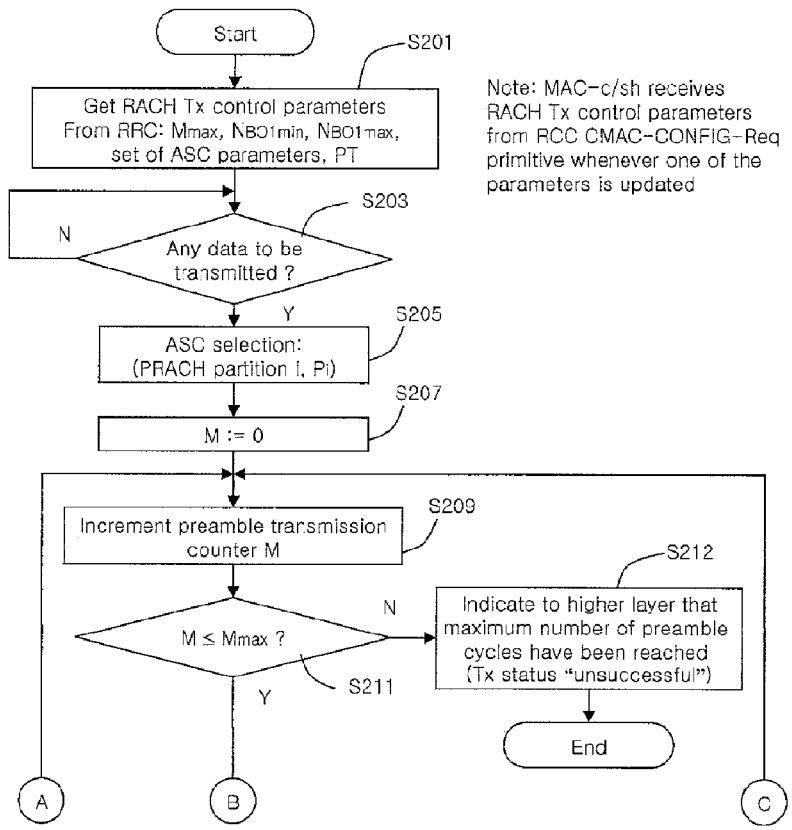

[Fig. 3]
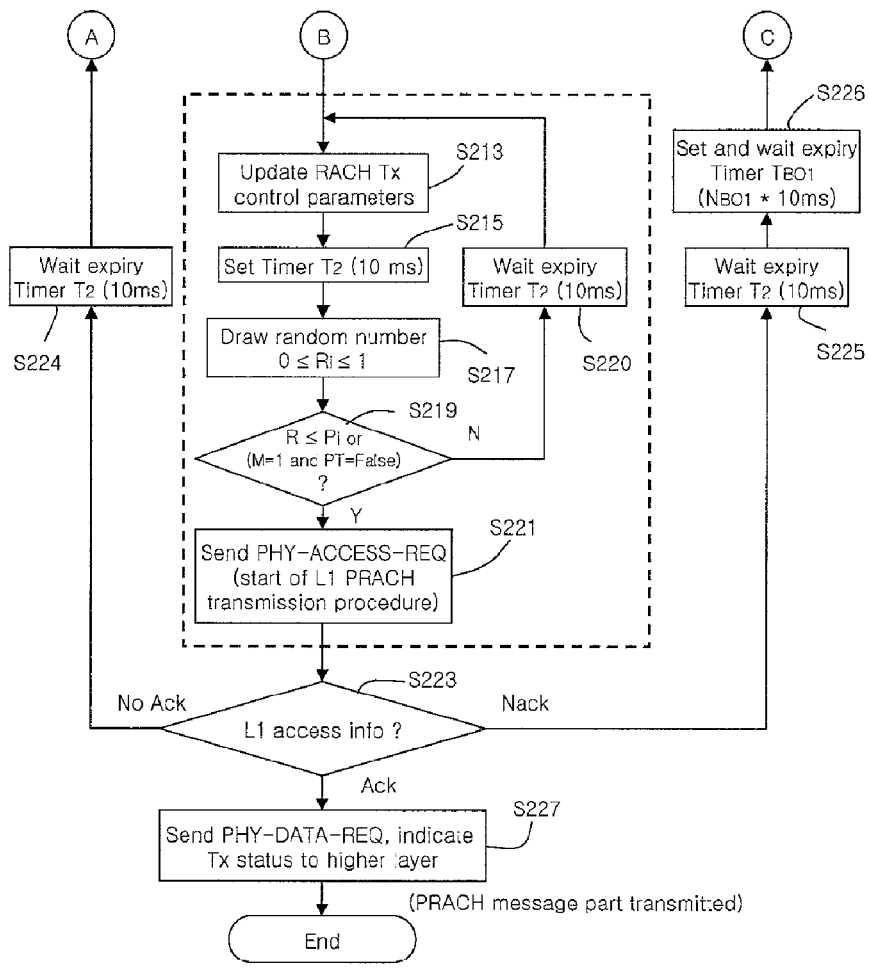
[Fig. 4]
| | 1.00 | 2.00 | 3.00 | 4.00 | 5.00 | 6.00 | 7.00 |
|---|---|---|---|---|---|---|---|
| 0.10 | 0.10 | 0.20 | 0.80 | 6.40 | 102.40 | 3276.80 | 209715.20 |
| 0.20 | 0.05 | 0.10 | 0.40 | 3.20 | 51.20 | 1638.40 | 104857.60 |
| 0.30 | 0.03 | 0.07 | 0.27 | 2.13 | 34.13 | 1092.27 | 69905.07 |
| 0.40 | 0.03 | 0.05 | 0.20 | 1.60 | 25.60 | 819.20 | 52428.80 |
| 0.50 | 0.02 | 0.04 | 0.16 | 1.28 | 20.48 | 655.36 | 41943.04 |
| 0.60 | 0.02 | 0.03 | 0.13 | 1.07 | 17.07 | 546.13 | 34952.53 |
| 0.70 | 0.01 | 0.03 | 0.11 | 0.91 | 14.63 | 468.11 | 29959.31 |
| 0.80 | 0.01 | 0.03 | 0.10 | 0.80 | 12.80 | 409.60 | 26214.40 |
| 0.90 | 0.01 | 0.02 | 0.09 | 0.71 | 11.38 | 364.09 | 23301.69 |
Persistence scaling factor / Dynamic persistence level

METHOD OF TRANSMITTING ON A RANDOM ACCESS CHANNEL BASED ON PARAMETER RELATING TO PERFORMANCE OF PERSISTENCE TEST

CROSS-REFERENCE TO RELATED APPLICATIONS

Pursuant to 35 U.S.C. §119, this application is a national stage application of International Application No. PCT/KR2006/003782, filed on Sep. 22, 2006, which claims the benefit of earlier filing date and right of priority to U.S. Provisional Application No. 60/732,288, filed on Oct. 31, 2005.

TECHNICAL FIELD

The present invention relates to radio communications, and in particular, relates to a method of transmitting a random access channel.

BACKGROUND ART

A radio (wireless) communication system may be comprised of an access network and a plurality of access terminals. The access network may include access points, such as Node Bs, base stations, or the like, that allow the access terminals to connect with the access network for uplink (UL: terminal-to-network) communications and downlink (DL: network-to-terminal) communications via various types of channels. The access terminals may be user equipment (UE), mobile stations, or the like.

Although the concepts described hereafter may be applicable to different types of communication systems, the Universal Mobile Telecommunications System (UMTS) will be described merely for exemplary purposes. A typical UMTS has at least one core network (CN) connected with at least one UTRAN (UMTS Terrestrial Radio Access Network) that has Node Bs acting as access points for multiple UEs.

FIG. 1 shows the radio interface protocol architecture according to the 3GPP radio access network standards. The radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 1 can be divided into a first layer (L1), a second layer (L2), and a third layer (L3) based on the three lower layers of an open system inter-connection (OSI) standard model. The first layer (L1), namely, the physical layer (PHY), provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted.

The MAC layer is connected to the physical layer by transport channels and can be divided into a MAC-b sub-layer, a MAC-d sub-layer, a MAC-c/sh sub-layer, a MAC-hs sub-layer and a MAC-m sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the Random Access Channel (RACH). The MAC-m sub-layer may handle the MBMS data. The MAC-d sub-layer manages a dedicated channel (DCH), which is a dedicated transport channel for a specific terminal. The MAC-d sub-layer is located in a serving RNC (SRNC) that manages a corresponding terminal and one MAC-d sub-layer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as IPv4 or IPv6, efficiently on a radio interface with a relatively small bandwidth. For this purpose, the PDCP layer reduces unnecessary control information used in a wired network, namely, a function called header compression is performed.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally, the RRC layer handles user mobility within the RAN, and additional services, e.g., location services.

Call setup is the process of establishing physical channels and negotiating service configuration parameters between a UE and a Node B to allow communication. Call setup procedures fall under two categories: UE originated call setup that occurs when the UE user makes a call, and UE terminated call setup that occurs when a call is made to the UE.

In UMTS, the UE may use an access channel, such as the Random Access Channel (RACH) for uplink communications. For message transmission procedures using the RACH, the following factors need to be considered.

To enable a UE to access the RACH, the UTRAN (Node B) transmits system information to all UEs within a cell. The network (UTRAN) may send such system information to the UE via a message having a Master Information Block (MIB) and System Information Blocks (SIBs). The MIB may provide scheduling information for the SIBs. Each SIB may have system information elements (IEs). The SIBs may have different characteristics related to their repetition rates, the requirements for the UEs to re-read the SIBs, and the like.

The SIBs may be broadcast throughout a cell over a broadcast channel to provide terminals (UEs) in the cell with basic system information. A terminal (ULE) may read the MIB on a broadcast control channel (BCCH) followed by the appropriate SIBs. Among the many types of SIBs, SIB type 7 (SIB7) is relevant for call setup employing RACH procedures.

After receiving the appropriate system information, the terminal sends a preamble to the network (e.g., to the Node B). This preamble contains the necessary information to allow the actual message to be sent from the terminal to the network. Namely, for call setup, the UE transmits a preamble to the access network (e.g., Node B) before sending the actual message through a random access channel (RACH).

An acquisition indication procedure for the preamble reception is performed before a message is transmitted. Here, an Acquisition Indication Channel (AICH) may be used. If an acquisition indicator signal (e.g., Acquisition Indication Channel (AICH) indicator) of the transmitted preamble does not arrive from the access network within a certain time period, the terminal increases its transmission power, re-transmits the preamble and waits to receive the acquisition indicator signal from the access network. When the terminal that has transmitted the preamble to the access network receives the acquisition indicator signal within the time period, the message is transmitted thereafter.

Additionally, the terminal can check whether or not the transmitted message is received by the access network without error upon receiving a response (ACK or NACK) for the message from the access network. Here, the response is not an acquisition indicator signal of the message, but a response signal of the message content. To transmit the response (ACK or NACK) to the message to the terminal, the upper layers of the access network performs appropriate processing.

It should be noted that the RACH is typically composed of many sub-channels defined by preamble code sequences over a timeslot. Information about the available RACH sub-channels and available preamble signatures according to ASC (Access Service Class) is included in Physical RACH (PRACH) information. According to the PRACH information, a preamble signature is assigned to a UE depending on what ASC the UE intends to use on an available RACH sub-channel.

Here, the preamble signature is chosen randomly amongst the set of available signatures. After the preamble signature is determined, access slots for the preamble are determined. When there are no available access slots, the next slot set is considered. Then, the UE transmits to the UTRAN the preamble with the determined signature in the access slots with predetermined power.

The basic concepts related to the random access channel (RACH) are known in the art of mobile communications. For example, several users can independently transmit data on a RACH, but this may result in a collision between different users. In order to reduce the probability of collisions and increase the probability of successful transmissions on a RACH, certain transmission rules are specified in order to provide waiting times to delay the transmission of data. One example of a waiting time is called a back off time, whereby the user backs off from transmitting any information on the RACH for a certain period of time.

DISCLOSURE OF INVENTION

Technical Problem

However, the present inventor has recognized that such delays and waiting times in the related art RACH access procedure (i.e., RACH transmission control procedure) may not always be necessary.

Technical Solution

One purpose of the present invention is to optimize call setup procedures by determining whether a trigger for a random access procedure is independent for a restricted number of terminals, and performing a preamble transmission with or without a delay based upon the determining.

A persistence test is added to the RACH access procedure on the MAC level before the transmission of the first preamble. This persistence test is dynamically performed based upon certain conditions such that delays in call setup can be minimized.

BRIEF DESCRIPTION OF THE DRAWINGS

FIG. 1 shows the radio interface protocol architecture according to the 3GPP radio access network standards.

FIGS. 2 and 3 show an exemplary RACH transmission control procedure according to an embodiment of the present invention.

FIG. 4 is a table showing the average delay values (indicated in seconds) resulting from the persistence values calculated according to an embodiment of the present invention.

MODE FOR THE INVENTION

One aspect of the present invention is the recognition by the present inventor regarding the problems and drawbacks of the related art described above. Based upon such recognition, the features of the present invention have been developed.

Although the following description will refer to optimized RACH procedures for UMTS merely for the sake of explanation, the features of the present invention are clearly intended to be applicable to various other types of communication systems that would benefit from employing the particular features of the present invention.

It should be noted that FIGS. 2 and 3 show the exemplary operation of the transmission control procedure according to the present invention are not meant to impose any restrictions on implementation. For example, the names of exemplary primitives that may be employed are specified, but other primitives or other means may also be used.

The RACH transmission procedures in FIGS. 2 and 3 may be controlled by the UE MAC sub-layer (MAC), in cooperation with other protocol entities (layers), such as the Layer 1 (L1) protocol and the physical layer (PHY) as shown in FIG. 1.

As such, certain relative portions of the 3GPP specification, such as 25.321, Medium Access Control (MAC) protocol specification, V6.5.0 (and its related enhancements) are part of the embodiments of the present invention and constitute part of the present disclosure by being incorporated herein by reference.

The procedure where the UE sends a first message to the network is referred to as initial access. For this, the common uplink channel called a RACH (Random Access Channel) is used. In all cases (GSM and UMTS systems), the initial access starts from the UE with a connection request message including the reason of the request, and the answer from the network indicating the allocation of radio resources for the requested reason. There can be at least one reason, called an establishment cause (i.e., reason for establishment, etc.), for sending a connection request message.

FIGS. 2 and 3 show that before each L1 procedure (i.e. ramping in order to allow reception of an AICH indicator which in turn allows sending of the message part) a delay according to the persistency value P1 is introduced (dotted box portion: S213, S215, S217, S219, S220, S221). The persistence depends on the Persistence scaling factors according to the access class/the logical channel priority and the Dynamic persistency value as broadcast in SIB7 and is updated before each test.

It can be useful to introduce a random delay for the call establishment depending on the priority of the data that is supposed to be sent for events where large amounts of users try to access a cell simultaneously. Examples of such events may be when a bus (with passengers having UEs) comes out of a tunnel into coverage and all UEs will initiate a LA/RA update, when a cell goes out of service, and the like.

However, in the case that the trigger for the RACH procedure is independent for a restricted number of UEs (e.g. at call establishment of an individual user, when a user has uplink data to be transmitted, etc.), there does not seem to be any advantage of delaying the actual start of the L1 procedure (i.e., preamble transmission). Namely, there are some situations where a delay (or waiting time) before the first preamble is sent would not be advantageous.

Thus, there is a need to control the use of a persistence test in the RACH access procedure on MAC level before the transmission of the first preamble.

This is shown in the FIG. 2, where a parameter PT has been introduced (S201), which is received by the MAC from the RRC/RLC, such that at transmission on the RACH of certain PDUs received from RLC, the persistence test (i.e., procedures in the dotted box) is not done. For example, the first persistence first when M=1 is not done in the case PT is set to False.

There may be various conditions that need to be considered to determine whether the PT should be set as TRUE or FALSE. For example, the following factors may be considered:

whether or not the PDUs transmitted via RACH contain c-plane data whether the PDU contains the RRC Connection Request message depending on the IE Establishment cause whether the PDU contains the Cell Update message, depending on the value/presence of the IE Establishment cause whether the PDU contains the Cell Update message, depending on the IE Cell update cause The persistence test should not be performed before the start of the first L1 transmission (i.e. PT should be FALSE) in the case that the RRC Connection Request/Cell Update message is sent with any of the following Establishment causes:

Originating Conversational Call,
Originating Streaming Call,
Originating Interactive Call,
Originating Background Call,
Originating Subscribed traffic Call,
Terminating Conversational Call,
Terminating Streaming Call,
Terminating Interactive Call,
Terminating Background Call,
Call re-establishment The above Establishment causes may be more broadly characterized as being related to originating calls, terminating calls, and/or call re-establishment.

Also, the persistence test (PT) may be set to TRUE for the following cases (i.e., for certain types of information):

Emergency Call,
Inter-RAT cell re-selection,
Inter-RAT cell change order,
Registration, Detach,
Originating High Priority Signalling,
Originating Low Priority Signalling,
Terminating High Priority Signalling,
Terminating Low Priority Signalling,
Terminating—cause unknown, MBMS reception, MBMS p-t-p RB request It may be useful if the persistence test (PT) is not performed before the start of the first L1 transmission (i.e. PT should be FALSE) if user plane data or other RRC messages are transmitted, because the trigger for the RACH procedure in different UEs should be relatively independent.

As such, the present invention outlines the possibility to optimize the RACH control procedure by removing unnecessary delay before the first L1 transmission is started which is caused by the persistence test.

It may be noted that the persistence value may be calculated as:

$$P = s * 2^{-(N-1)};$$

where s is the scaling factor from 0.1 to 0.9 and N is the persistence level from 1 to 7, which gives average delays introduced in seconds, as shown in FIG. 4.

Namely, FIG. 4 is a table showing the average delay values (indicated in seconds) resulting from the persistence values calculated according to an embodiment of the present invention. Here, the vertical axis shows persistence scaling factors (0.10 to 0.90), the horizontal axis shows the dynamic persistence levels (1.00 to 7.00), and the table entries indicate the resulting average delay values (in units of seconds).

In addition to the above described situations, other factors may also be considered to determine whether the random delay before transmitting the first preamble would be necessary or not.

Namely, among the various parameters sent via the SIB7, two examples related to the present invention are a dynamic persistence level (value) and uplink (UL) interference information for which the UE needs to acquire valid values before initiating the RACH procedure.

In some networks, the SIB 7 is scheduled rather infrequently. Therefore, it is likely that UEs that want to access the RACH would need to wait for the next scheduling of the SIB7 before the RACH access can be started. In this case, most RACH accesses of the UEs would occur after the SIB7 is received by the UE, and it could be argued that by applying a high value of Dynamic persistence level the network could somehow spread the RACH accesses and thereby avoid that too many collisions occur directly after the transmission of the SIB7. Although this would imply even more delay for the average RACH access, the present invention further proposes that one condition for not applying the persistence test should be when the UE has valid information for the IE UL interference. The term valid should take into account the possible changes made to the UE due to the discussion on SIB7.

Thus, the UE may omit the persistence test when it has valid information for the IE UL interference at the moment where the higher layers initiate the RACH request, i.e. the UE does not read the SIB7 before initiating the RACH request.

The present invention allows the reduction of the call setup delay in many cases, especially in the case of voice calls when the UE was already able to read the SIB7 information. Although the delay time that can be saved may not be very large in magnitude (i.e., approximately, tens of milliseconds), since the improvements provided by the present invention come at no cost for the network and are completely backwards compatible, implementation of the features according to the present invention are easy and worthwhile.

As described above, the RACH transmission control procedure of the present invention can be achieved. Referring back to FIGS. 2 and 3, the exemplary procedures of the present invention can be further explained in more detail as follows.

The MAC controls the timing of each initial preamble ramping cycle as well as successive preamble ramping cycles in case that no acknowledgement or a negative acknowledgement is received on the AICH. It should also be noted that in Cell_FACH state, the UF should coordinate the UL transmission schedule with the measurement schedule in FACH measurement occasions so as to minimize any delays associated with inter-frequency measurements.

The MAC receives various RACH transmission (Tx) control parameters from the RRC (S201). Such parameters may be transferred by using various means, such as the CMAC-CONFIG-Req primitive. Some examples of the RACH Tx control parameters may include:
  a set of Access Service Class (ASC) parameters, which includes for each ASC, i=0, . . . , NumASC, an identification of a PRACH partition and a persistence value Pi (=transmission probability);
  a maximum number of preamble ramping cycles $M_{max}$;
  a range of backoff interval for timer $T_{BO1}$, given in terms of numbers of transmission 10 ms time intervals $N_{BO1max}$ and $N_{BO1min}$, applicable when negative acknowledgement on the AICH is received.

When there is data to be transmitted (S203, S205), the MAC selects the ASC from the available set of ASCs, which consists of an identifier (i) of a certain PRACH partition and an associated persistence value Pi. Various procedures for ASC selection may be used.

The ramping cycle is initialized, a preamble transmission counter M is incremented, and the current ramping cycle is compared with the maximum number of allowed preamble ramping cycles $M_{max}$ (S207, S209, 211).

Based on the persistence value Pi, the UE decides whether or not to start the L1 PRACH transmission procedure in the present transmission time interval (TTI). If indicated by higher layers, the persistence value for the first L1 PRACH transmission procedure is skipped by setting the parameter PT to FALSE. Otherwise, PT is set to TRUE such that the first L1 PRACH transmission procedure is performed (S213, S215, S217, S219).

If transmission is allowed, the PRACH Tx procedure (starting with a preamble power ramping cycle) is initiated by the sending of a PHY-ACCESS-REQ primitive (S221). The MAC then waits for access information from L1 via the PHY-ACCESS-CNF primitive. If transmission is not allowed, a new persistency check is performed in the next TTI (S220). The persistency check is repeated until transmission is permitted.

When the preamble has been acknowledged on the AICH, L1 access information with a parameter value (ready for data transmission) is indicated to the MAC with the PHY-ACCESS-CNF primitive (S223). Then, data transmission is requested with the PHY-DATA-REQ primitive, and the PRACH transmission procedures shall be completed with transmission of the PRACH message part according to L1 specifications. Successful completion (Tx status) of the MAC transmission control procedure may be indicated to the higher layer(s) (S227).

When PHY indicates that no acknowledgement on the AICH is received while the maximum number of preamble re-transmissions is reached (e.g., defined by parameter: Preamble_Retrans_Max on L1), a new persistency test is performed in the next TTI. The timer $T_2$ ensures that two successive persistency tests are separated by at least one 10 ms time interval (S224).

In case that a negative acknowledgement has been received on the AICH, a back off timer $T_{BO1}$ is started (S225). After expiry of the timer, a persistence check is performed again (S226). The backoff timer $T_{BO1}$ is set to an integer number of $N_{BO1}$ 10 ms time intervals, randomly drawn within an interval $0 \leq N_{BO1min} \leq N_{BO1} \leq N_{BO1max}$ (with uniform distribution). $N_{BO1min}$ and $N_{BO1max}$ may be set equal when a fixed delay is desired, and even can be set to zero when no delay other than the one due to persistency is desired.

Before a persistency test is performed, it shall be checked whether any new RACH transmission control parameters have been received from the RRC with the CMAC-CONFIG-Req primitive. The latest set of RACH transmission control parameters may be applied.

If the maximum of preamble ramping cycles $M_{max}$ is exceeded, failure of RACH transmission may be reported to the higher layer(s) (S212).

Both a transmission failure and also a successful completion of the MAC transmission control procedure shall be indicated individually for each logical channel of which data was included in the transport block set of that access attempt. If a transparent mode RLC is employed (i.e., for CCCH), the transmission status is reported to the RRC with a CMAC-STATUS-Ind primitive. For logical channels employing acknowledged or unacknowledged mode RLC, the transmission status is reported to the RLC with a MAC-STATUS-Ind primitive.

The present invention provides a method of transmitting on a random access channel (RACH) from an access terminal to a network, the method comprising: initiating a transmission on the RACH; and determining a transmission criteria that indicates whether a preamble should be transmitted immediately or after a random delay.

The transmission criteria may depend on whether the RACH transmission contains at least one of the following: user plane data or control plane data, a Radio Resource Control (RRC) Connection Request message depending on an Information Element (IE) Establishment cause, a Cell Update message depending on a value or presence of an Information Element (IE) Establishment cause, and a Cell Update message depending on an Information Element (IE) Cell Update cause. The method may further comprise: performing a persistence test before transmitting the preamble if the transmission criteria indicates that the preamble should be transmitted after the random delay. The method steps may be performed by a medium access control (MAC) layer. The persistence test values may be received from a Radio Resource Control (RRC) layer above the MAC layer. The method may further comprise: determining whether valid information for a dynamic persistence level is available or needs to be acquired from the network. The transmission criteria may be set to indicate that the preamble should be transmitted immediately if the RACH transmission: includes no control plane data; includes a RRC Connection Request message having a particular IE Establishment cause; includes a Cell Update message having a particular value or presence of an IE Establishment cause; or includes a Cell Update message having a particular IE Cell Update cause. The transmission criteria may be set to indicate that the preamble should be transmitted immediately if the terminal has valid information related to uplink interference. The valid information may take into account any possible changes made to the terminal based on System Information Block type 7.

Also, the present invention provides a method of performing call set up between an access terminal and a network, the method comprising: determining whether a trigger for a random access procedure is independent for a restricted number of terminals; and performing a preamble transmission for the random access procedure with or without a delay based upon the determining.

If the trigger relates to a call establishment of an individual user or when a user has uplink data to be transmitted, then performing the preamble transmission without the delay may be done. The uplink data may contain user plane data or other Radio Resource Control messages. The uplink data may be a Radio Resource Control Connection Request message or a Cell Update message. If the trigger indicates that the terminal has valid information related to uplink interference, then performing the preamble transmission without the delay may be done.

Additionally, the present invention provides a radio interface protocol stack for an access terminal, the protocol stack comprising: a medium access control layer to receive protocol data units and control parameters that include a persistence test value from one or more higher layers; and a physical layer cooperating with the medium access control layer to variably delay a random access procedure based upon the persistence test value.

The persistence test value may indicate that the random access procedures should be performed without an initial persistence test if the protocol data units relate to a call establishment. The persistence test value may indicate that the random access procedures should be performed without an initial persistence test if the protocol data units relate to uplink data that needs to be sent. The persistence test value may indicate that the random access procedures should be performed without an initial persistence test if the access terminal has valid information related to uplink interference. The higher layers may comprise a Radio Resource Control layer and a Radio Link Control layer.

Furthermore, the present invention provides radio communication signals transmitted from an access terminal to an access network during a random access procedure, the signals comprising computer-readable instructions for: transmitting a preamble part with or without an initial random delay based upon a persistence test that is performed when the random access procedure relates to call establishment or when uplink data needs to be sent or when the access terminal already has appropriate uplink interference information; and transmitting a message part after receiving acknowledgement of the preamble part from the access network.

Thus far, an exemplary scheme for optimizing call set up procedures has been described for mobile communication systems. However, the features of the present invention may also be applicable to other types of communication systems (such as satellite mobile communication systems) that may benefit from minimizing the delays that occur during RACH transmission control or other types of procedures.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting on a random access channel (RACH) from an access terminal, the method comprising:
   initiating a transmission on the RACH;
   receiving a parameter indicating whether a persistence test is to be performed before transmission of a preamble, wherein the parameter is a binary indicator; and
   bypassing performance of the persistence test to proceed with the transmission of the preamble if the received parameter indicates that the persistence test is not to be performed,
   wherein the received parameter indicates that the persistence test is not to be performed if the initiated transmission at least:
   includes no control plane data;
   includes a Radio Resource Control (RRC) Connection Request message indicating a specific Information Element (IE) Establishment cause;
   includes a Cell Update message indicating a specific value or presence of an IE Establishment cause; or
   includes a Cell Update message indicating a specific IE Cell Update cause.

2. The method of claim 1, wherein the received parameter is based on whether the initiated transmission includes at least:
   user plane data or control plane data,
   a Radio Resource Control (RRC) Connection Request message indicating a specific Information Element (IE) Establishment cause,
   a Cell Update message indicating a specific value or presence of an IE Establishment cause, or
   a Cell Update message indicating a specific IE Cell Update cause.

3. The method of claim 2, further comprising:
   performing the persistence test before the transmission of the preamble if the received parameter indicates that the persistence test is to be performed.

4. The method of claim 3, wherein initiating the transmission, receiving the parameter, bypassing the performance of the persistence test and performing the persistence test are performed by a medium access control (MAC) layer.

5. The method of claim 4, wherein the received parameter is received from a Radio Resource Control (RRC) layer above the MAC layer.

6. The method of claim 5, further comprising:
   determining whether valid information for a dynamic persistence level is available or needs to be acquired.

7. The method of claim 1, wherein the received parameter indicates that the persistence test is not to be performed further if the access terminal has valid information related to uplink interference.

8. The method of claim 7, wherein the valid information takes into account any possible changes made to the access terminal based on System Information Block type 7.

9. A radio interface protocol stack for an access terminal, the protocol stack comprising:
   a medium access control layer for receiving protocol data units and control parameters that include a parameter indicating whether a persistence test is to be performed before transmission of a preamble, from one or more higher layers, wherein the parameter is a binary indicator; and a physical layer for cooperating with the medium access control layer to bypass performance of the persistence test to proceed with the transmission of the preamble if the received parameter indicates that the persistence test is not to be performed, wherein the received parameter indicates that the persistence test is not to be performed if the initiated transmission at least:

includes no control plane data;

includes a Radio Resource Control (RRC) Connection Request message indicating a specific Information Element (IE) Establishment cause;

includes a Cell Update message indicating a specific value or presence of an IE Establishment cause; or includes a Cell Update message indicating a specific IE Cell Update cause.

10. The protocol stack of claim 9, wherein the received parameter indicates that the persistence test is not to be performed if the protocol data units relate to a call establishment.

11. The protocol stack of claim 9, wherein the received parameter indicates that the persistence test is not to be performed if the protocol data units relate to uplink data that needs to be sent.

12. The protocol stack of claim 9, wherein the received parameter indicates that the persistence test is not to be performed if the access terminal has valid information related to uplink interference.

13. The protocol stack of claim 9, wherein the parameter is received from higher layers comprising a Radio Resource Control layer and a Radio Link Control layer.

* * * * *